United States Patent [19]

Zavatkay

[11] 4,340,191
[45] Jul. 20, 1982

[54] SEAT BELT RETRACTOR SPRING ASSEMBLY

[75] Inventor: Robert J. Zavatkay, Torrington, Conn.

[73] Assignee: Barnes Group Inc., Bristol, Conn.

[21] Appl. No.: 190,977

[22] Filed: Sep. 26, 1980

[51] Int. Cl.³ .................. A62B 35/00; B65H 75/48
[52] U.S. Cl. .................................. 242/107; 185/37; 242/107.5
[58] Field of Search .................. 242/107–107.7; 29/446; 185/37, 39, 45

[56] References Cited

U.S. PATENT DOCUMENTS

| | | | |
|---|---|---|---|
| 1,138,738 | 5/1915 | Earll | 185/45 |
| 2,718,282 | 9/1955 | Davis | 185/39 |
| 3,033,488 | 5/1962 | Weber | 242/107.5 |
| 3,689,004 | 9/1972 | Brown et al. | 242/107.6 X |
| 4,088,280 | 5/1978 | Arlavskas et al. | 242/107 |
| 4,159,809 | 7/1979 | Rawson | 242/107 |

Primary Examiner—John M. Jillions
Attorney, Agent, or Firm—Scrivener, Clarke, Scrivener & Johnson

[57] ABSTRACT

The invention relates to a spring assembly for retracting a spirally wound seat belt to retracted condition after extension in use, and provides means for locking the spring in pre-wound condition prior to assembly with the seat belt.

1 Claim, 6 Drawing Figures

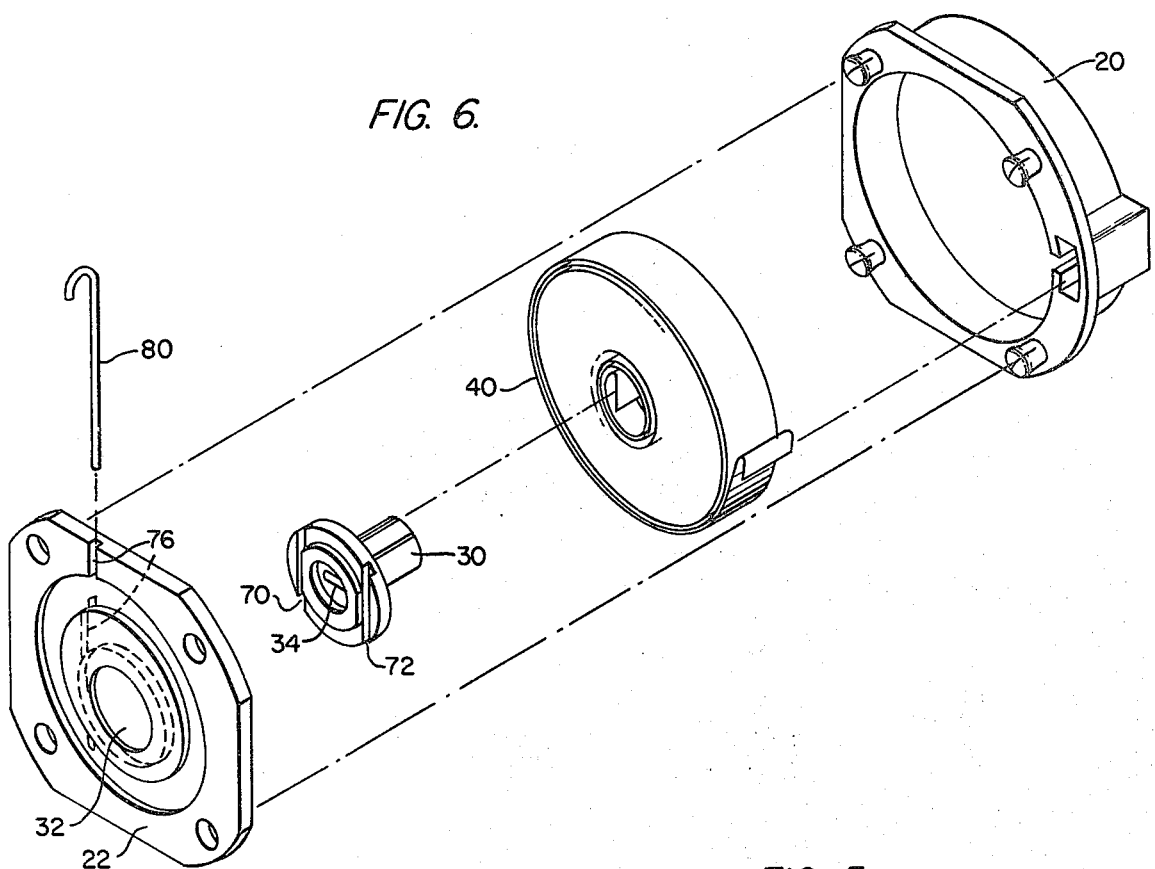
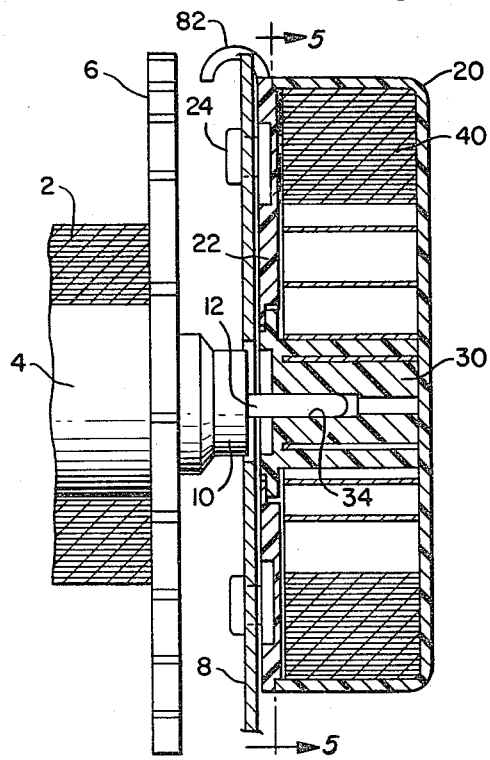
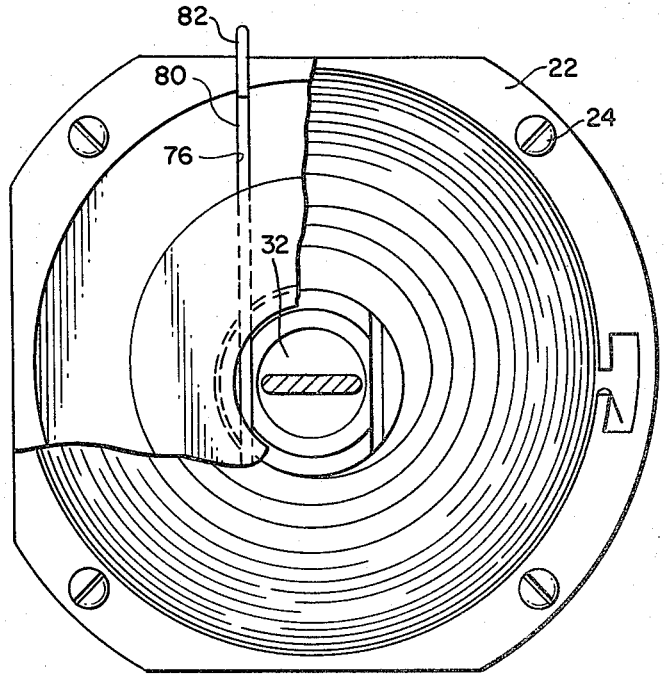

SEAT BELT RETRACTOR SPRING ASSEMBLY

SUMMARY OF THE INVENTION

The invention provides means for winding a seat belt to retracted condition after extension in use, the means comprising a spring assembly which includes a casing, a shaft within the casing and a spiral spring within the casing with its ends connected to the casing and the shaft, together with means for releasably connecting the shaft to the casing after the spring is wound in order to hold the spring in pre-wound condition.

DESCRIPTION OF THE DRAWINGS

FIG. 4 is a transverse sectional view showing a wound seat belt in operative association with a retractor assembly which includes a second form the invention may take;

FIG. 5 is a view taken on line 5—5 of FIG. 4, and

FIG. 6 is an exploded perspective view of the parts including the second embodiment.

DESCRIPTION OF THE INVENTION

Figure 1:
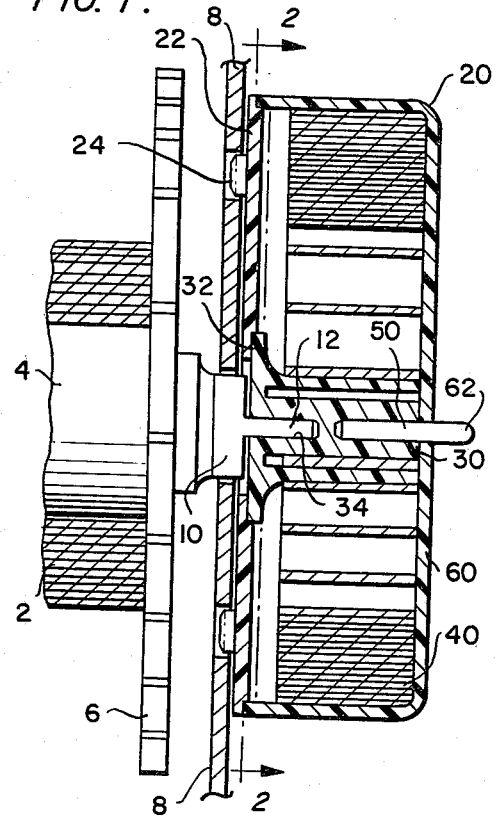
FIG. 1 is a transverse sectional view showing a wound seat belt in operative association with a retractor assembly including the means provided by the invention.
Figure 2:
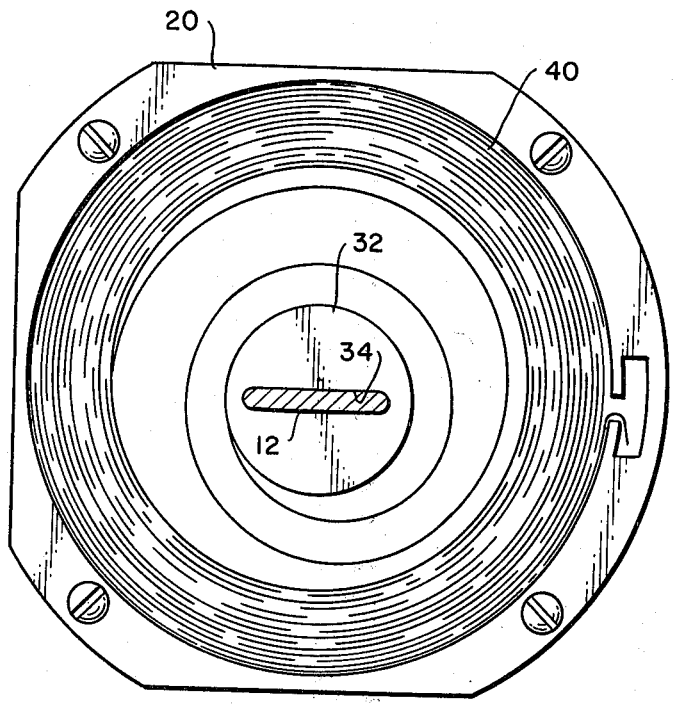
FIG. 2 is a view taken on line 2—2 of FIG. 1.
Figure 3:
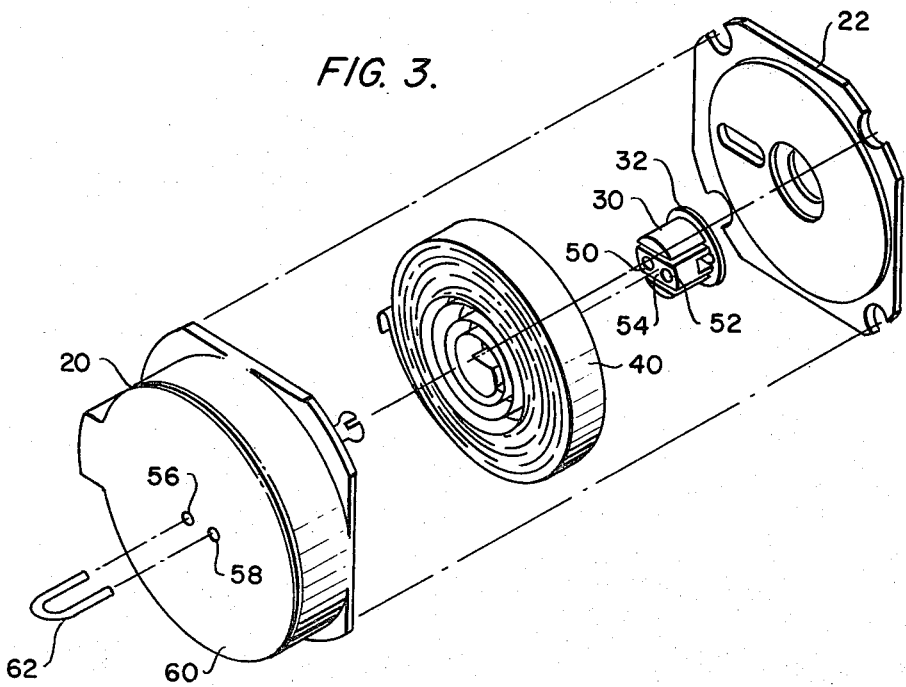
FIG. 3 is an exploded perspective view showing the parts which comprise the invention.

An embodiment of the apparatus provided by the invention for retracting to wound condition a strip of material such as a seat belt is disclosed in FIGS. 1 to 3 in operative association with a seat belt 2 which is spirally wound on a reel comprising a rotatable shaft 4 and end plates 6, only one of which is shown. The seat belt assembly is rotatably mounted on one or more plates 8 which form part of the main frame of the seat belt assembly. A shaft 10 is connected axially to the rotatable seat belt assembly and extends through plate 8 and is provided on its outer end surface with a diametrically extending blade 12.

The belt retractor device including the means provided by the invention comprises a casing formed of a cup-shaped cover 20 and a plate 22 which closes the open side of the casing and is mounted on fixed plate 8 by any suitable means such as the screws 24. A shaft 30 is mounted concentrically within the casing and is journaled in a central opening 31 in plate 22 for rotation with respect to the fixed casing and cover which form the spring housing. The end surface 32 of the shaft, which is the end surface adjacent the wound seat belt assembly, is formed with a diametrically extending kerf 34 which receives the blade 12 on shaft 10 which forms part of the rotatable seat belt assembly. A spirally wound spring 40 surrounds the shaft 30 within the housing and has its ends connected respectively to the shaft 30 and to the peripheral wall of the cover 20.

In the use and operation of the seat belt and belt retractor apparatus it is necessary to maintain the retractor spring in a normally wound condition so that it will be wound down on shaft 30 when the belt is pulled out and will then be in condition to retract the belt when it is released. It is therefore desirable to pre-wind the spring for installation in the seat belt assembly, and means are provided by the invention for maintaining the spring in such pre-wound condition. Such means comprise spaced parallel passages 50, 52 in the shaft 30 which extend axially of the shaft and open into its end surface 54 which is the surface adjacent the cover 20 and therefore opposite the seat belt assembly. These passages may be aligned with spaced openings 56, 58 in the bottom wall 60 of cover 20 by rotational adjustment of the shaft, and the parallel legs of a U-shaped clip 62 are passed through these openings and into the passages 50, 52 in the shaft, thereby locking the shaft to the casing and preventing its rotation, with consequent locking of the spring in the pre-wound condition.

It will be understood by those skilled in the arts to which this invention relates that in assembling the spring assembly prior to installation with the seat belt assembly the spring will be adjusted to a desired pre-wound condition by rotation of the shaft and then locked in this condition by inserting the legs of the clip 62 through openings 56, 58 in the cover 20 and into the passages 50, 52 in shaft 30, thereby locking the shaft to the casing and holding the spring in its pre-wound condition. The spring retractor assembly is then operatively connected to the seat belt assembly with the blade 12 on the belt shaft 10 positioned in the kerf 34 in shaft 30 in order to operatively connect the two shafts.

A second form which the invention may take is disclosed in FIGS. 4, 5 and 6 of the drawings. In this disclosure the basic parts of the seat belt assembly and the spring assembly may be identical and are so illustrated and numbered and need not be further described here.

The means disclosed in FIGS. 4, 5 and 6 for releasably connecting the shaft 30 to the casing comprise, first, two spaced parallel straight passages or grooves 70, 72 which are formed in the end surface 32 of shaft 30 on opposite sides of the kerf 34. An elongated passage 76 is formed in the cover plate 22 within the general plane of the plate, and extends from the outer peripheral edge of the plate through the part of the plate which surrounds the central opening 32 in which shaft 30 is journaled, then across central opening 32 as a chord of the opening, and then into the plate on the opposite side of the central opening. A straight pin 80 which has a diameter permitting it to be snugly pushed into the passage 76 is provided and is of such a length that it will extend throughout the entire length of the opening. The pin is preferably provided at its outer end with a bent part 82 which forms a handle facilitating the insertion and withdrawal of the pin into and from the passage 76.

It will be understood by those skilled in the art to which this invention relates that in assembling the spring operated belt retractor assembly the spring will be adjusted to its fully wound condition or to any desired condition of winding by rotation of shaft 30 and then locked in this condition by first aligning one of the slots 70, 72 with the passage 76 and then inserting the pin 80 into the passage and into and through one of the passages or grooves in the end surface of the shaft, thereby releasably connecting the shaft to the casing and locking the spring in its pre-wound condition. Installation is effected by connecting the spring assembly to the seat belt assembly by positioning the blade 12 on the seat belt shaft 10 in the kerf 34 in shaft 30 in order to operatively connect the two shafts, after which the pin 44 is removed, releasing the spring and causing it to resiliently hold the seat belt in its retracted condition.

I claim:

1. A spring operated seat belt retractor device, comprising:

(a) a frame, (b) a casing adapted to be connected to the frame and comprising:
   i. a cylindrical cup, and
   ii. a substantially planar cover connected to the cup and closing it and having a central opening therein,
(c) a shaft rotatably mounted in the opening in the cover,
(d) a spiral spring within the casing having its ends connected to the periphery of the cup and to the shaft, and
(e) means for releasably locking the spring to the casing in any predetermined prewound condition, comprising:
   i. a passage formed in the general plane of the cover having an opening in the periphery of the cover,
   ii. a passage formed in the shaft in the plane of the cover,
   iii. the passages in the cover and shaft being positioned to be longitudinally aligned on rotation of the shaft, and
   iv. a pin slidably mounted in the aligned passages with its outer end accessible from outside the periphery of the cover whereby when the casing is connected to the frame the outer end of the pin may be manually grasped to insert the pin into the aligned openings to lock the shaft to the casing or withdrawn to release the shaft from the casing.

* * * * *